US008767325B2

(12) United States Patent
Natsui

(10) Patent No.: US 8,767,325 B2
(45) Date of Patent: Jul. 1, 2014

(54) DATA RECORDING METHOD, DATA RECORDING APPARATUS, AND RECORDING MEDIUM

(75) Inventor: Akinaga Natsui, Osaka (JP)

(73) Assignee: Panasonic Corporation, Osaka (JP)

( * ) Notice: Subject to any disclaimer, the term of this patent is extended or adjusted under 35 U.S.C. 154(b) by 120 days.

(21) Appl. No.: 13/443,877

(22) Filed: Apr. 10, 2012

(65) Prior Publication Data

US 2012/0262813 A1 Oct. 18, 2012

(30) Foreign Application Priority Data

Apr. 12, 2011 (JP) ................................. 2011-087878

(51) Int. Cl.
G11B 27/36 (2006.01)
G11B 20/18 (2006.01)

(52) U.S. Cl.
USPC .......................................................... 360/31

(58) Field of Classification Search
None
See application file for complete search history.

(56) References Cited

U.S. PATENT DOCUMENTS

| | | | | |
|---|---|---|---|---|
| 4,214,280 A | * | 7/1980 | Halfhill et al. | 360/53 |
| 4,833,665 A | * | 5/1989 | Tokumitsu et al. | 369/53.17 |
| 4,835,757 A | * | 5/1989 | Abiko | 369/53.17 |
| 4,839,879 A | * | 6/1989 | Sawada et al. | 369/53.17 |
| 4,849,956 A | * | 7/1989 | Aizawa | 369/53.17 |
| 4,949,326 A | * | 8/1990 | Takagi et al. | 369/53.17 |
| 5,084,789 A | * | 1/1992 | Kamo et al. | 360/53 |
| 5,285,436 A | * | 2/1994 | Moribe | 369/47.14 |
| 5,339,319 A | | 8/1994 | Yamane et al. | |
| 5,841,600 A | | 11/1998 | Kaplan | |
| 6,046,872 A | * | 4/2000 | Okamoto et al. | 360/48 |
| 6,539,514 B1 | | 3/2003 | Bartlett | |
| 6,556,369 B1 | * | 4/2003 | Kanamaru et al. | 360/75 |
| 7,046,464 B2 | | 5/2006 | Hirose | |
| 7,408,731 B2 | * | 8/2008 | Uemura et al. | 360/48 |
| 2005/0007700 A1 | * | 1/2005 | Nagai | 360/241.1 |
| 2007/0189138 A1 | * | 8/2007 | Kuroda et al. | 369/47.51 |
| 2007/0291610 A1 | * | 12/2007 | Hoshizawa | 369/53.31 |

(Continued)

FOREIGN PATENT DOCUMENTS

| | | |
|---|---|---|
| JP | H04-053071 A | 2/1992 |
| JP | H04-067469 A | 3/1992 |

(Continued)

OTHER PUBLICATIONS

Office Action for the corresponding Japanese Patent Application No. 2012-090534, dated Jul. 23, 2013.

(Continued)

*Primary Examiner* — Peter Vincent Agustin
(74) *Attorney, Agent, or Firm* — Shinjyu Global IP

(57) ABSTRACT

The data recording apparatus for recording data to a recording medium having one or more tracks arranged in parallel comprises a data recorder configured to record data to the one or more tracks, a memory configured to store data, and a controller configured to control the data recorder. The controller determines whether or not the one or more tracks include a data defective region in which the data has not been recorded properly, stores in the memory the data that has not been recorded properly, designates a position corresponding to the data defective region, which is in a track arranged in parallel to the data defective region, and reads from the memory the data that has not been recorded properly, and records that data to the position corresponding to the data defective region.

19 Claims, 7 Drawing Sheets

(56) References Cited

U.S. PATENT DOCUMENTS

2008/0130444 A1* 6/2008 Kikukawa et al. ......... 369/53.15
2008/0198491 A1* 8/2008 Cho et al. ..................... 360/31
2009/0028028 A1* 1/2009 Watanabe et al. ............ 369/94
2012/0262813 A1* 10/2012 Natsui ........................... 360/31

FOREIGN PATENT DOCUMENTS

| JP | H04-355201 A | 12/1992 |
| JP | H09-297967 A | 11/1997 |
| JP | H10-334608 A | 12/1998 |
| JP | H10-334622 A | 12/1998 |
| JP | 2000-067529 A | 3/2000 |
| JP | 2002-216438 A | 8/2002 |
| JP | 2006-134396 A | 5/2006 |
| JP | 2008-262708 A | 10/2008 |

OTHER PUBLICATIONS

The Office Action from the corresponding Japanese Patent Application No. 2012-090534 dated Feb. 12, 2014.

* cited by examiner

DATA RECORDING METHOD, DATA RECORDING APPARATUS, AND RECORDING MEDIUM

CROSS-REFERENCE TO RELATED APPLICATIONS

This application claims priority based on Japanese Patent Application No. 2011-087878 filed on Apr. 12, 2011. The entire disclosure of Japanese Patent Application No. 2011-087878 is hereby incorporated herein by reference.

BACKGROUND OF THE INVENTION

1. Field of the Invention

The present invention relates to a data recording method and data recording apparatus for recording to a tape-form recording medium data that has been sent from a computer, and a recording medium.

2. Description of the Related Art

Data streamers that back up data, such as servers, have been known in the past. With a data streamer, an error correction code is added, and the desired data is recorded at high density.

More specifically, with a data streamer, data to be backed up is partitioned in predetermined block units, and an error correction code is produced by product code method. Further, a data streamer adds error correction codes to the data and records the data in a specific sequence to a tape-form recording medium. Then, the data streamer performs read-after-write, which involves reading the recorded data in order to confirm that the recorded signal was properly recorded to the recording medium. As a result of the read-after-write, retry processing, in which data that could not be read is re-recorded, is executed for any region on the recording medium in which the data that could not be read properly.

Also, with a data streamer, when data is reproduced, a signal read by scanning the tape-form recording medium is processed, so that the recorded data is sequentially reproduced. Here, error correction processing is performed using an error correction code added during recording. Thus, the data streamer backs up and restores the desired data with high reliability (see, for example, Japanese Laid-Open Patent Application 2002-216438 and Japanese Laid-Open Patent Application 2008-262708).

Meanwhile, in recent years we have seen explosive growth in the amount of data being handled, due to the steady increase in the use of computers and the Internet. Accordingly, recording apparatus used for backup need to have larger capacity. A so-called linear tape system has been prominent as one of these high-capacity recording apparatus. With a linear tape system, a plurality of magnetic heads are aligned in the tape width direction, and a signal is recorded by displacing the magnetic heads in the tape lengthwise direction with respect to the slender tape. With a linear tape system, data is recorded to a tape-form recording medium having multiple tracks, in which a plurality of recording tracks are arranged in parallel in the lengthwise direction of the tape-form recording medium.

The above-mentioned recording retry processing is carried out for the purpose of avoiding missed data recording caused by something like defect on the tape-form recording medium, for example. Thus, the data to be re-recorded is re-recorded at another place, rather than at a position nearby in the tape lengthwise direction. When data is re-recorded by retry processing, therefore, it is recorded in a different order from that of the original continuous data. Thus, for data reproduction, a step is required in which re-recorded data is temporarily stored in the memory and then rearranged in the order in which the data is to be reproduced. As a result, the data reproduction response is slower. In particular, since a linear tape system is a method in which a plurality of tracks disposed in parallel in the tape width direction are recorded at the same time, the re-recorded data ends up being re-recorded at a most distant location, and the response is even slower. Also, a larger memory capacity is necessary to temporarily store the data until it is rearranged.

The technology disclosed herein is intended to provide a data recording apparatus, data recording method, and recording medium with which data can be reproduced with better response.

SUMMARY OF THE INVENTION

In one aspect of the present invention, a data recording apparatus for recording data to a recording medium having one or more tracks arranged in parallel comprises a data recorder configured to r record the data to the one or more tracks, a memory configured to store the data, and a controller configured to control the data recorder. The controller determines whether or not the one or more tracks include a data defective region in which the data has not been recorded properly, stores in the memory the data that has not been recorded properly, designates a position corresponding to the data defective region, the position being in a track arranged in parallel to the data defective region, and reads from the memory the data that has not been recorded properly, and records the data that has not been recorded properly to the position corresponding to the data defective region.

DETAILED DESCRIPTION OF THE EMBODIMENTS

Selected embodiments of the present invention will now be described through reference to the drawings. The embodiments of the present invention given below are illustrative in nature, and from this disclosure it will be clear to a person skilled in the art that these embodiments are not intended to limit the invention defined by the appended claims or equivalents thereof.

Embodiment 1

1.1 Configuration of Data Recording Apparatus 100

Figure 1:
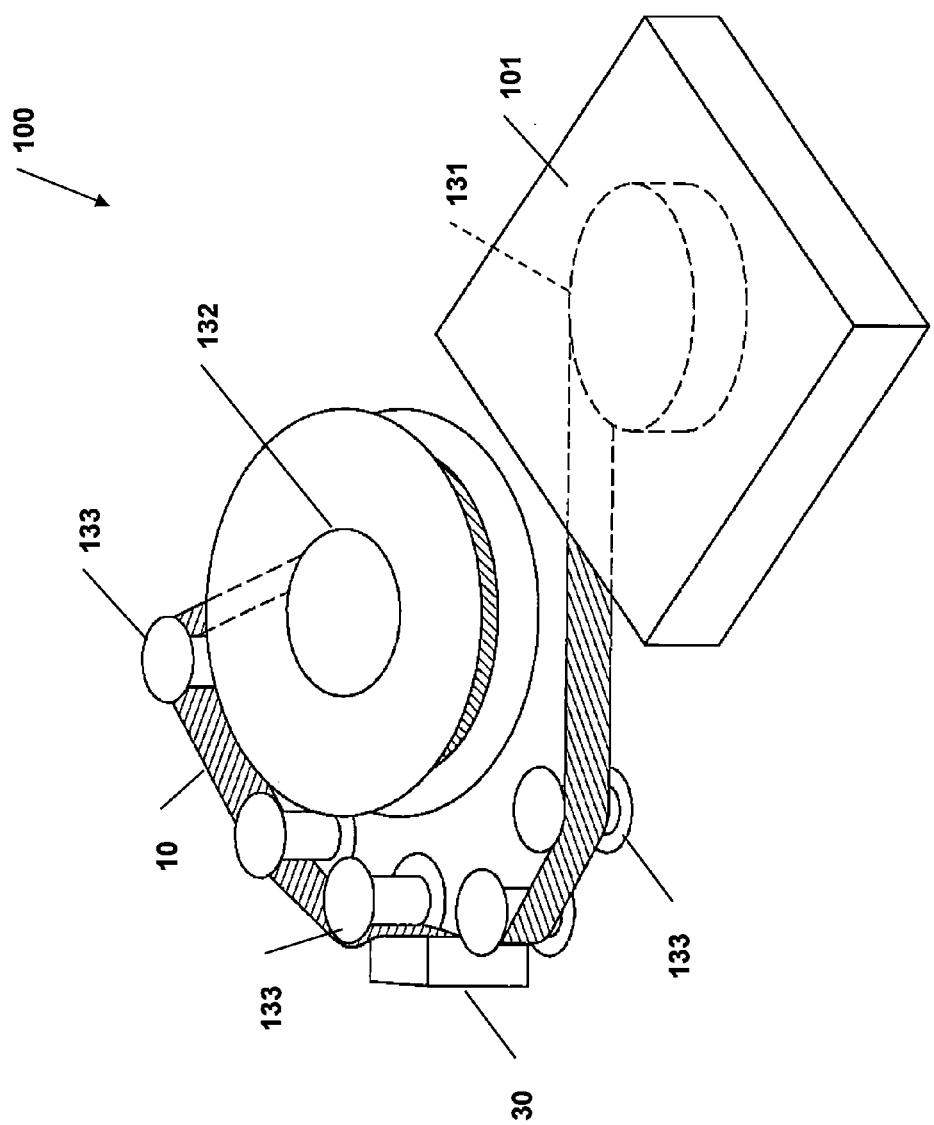
FIG. 1 is a simplified diagram of the configuration of the data recording apparatus pertaining to Embodiment 1.

FIG. 1 is a simplified view of the configuration of a data recording apparatus 100 pertaining to this embodiment.

This data recording apparatus 100 is a magnetic recording apparatus that uses a linear tape system to record and reproduce signals to and from a magnetic tape. The data recording apparatus 100 comprises a cassette 101, a first winding roll 131, a second winding roll 132, a plurality of guide rolls 133, and a head component 30.

The first winding roll 131 is rotated by a specific drive mechanism (not shown), and plays out a magnetic tape 10 (one example of a recording medium) from the cassette 101 in which the magnetic tape 10 is held. The second winding roll 132 winds up the magnetic tape 10 as it is played out by the first winding roll 131. The first winding roll 131 and the second winding roll 132 also change their rotational direction according to specific controls, so that the first winding roll 131 takes up the magnetic tape 10 played out by the second winding roll 132. In the following description, the direction in which the tape is played out by the first winding roll 131 will be called the forward direction (one example of a first direction), and the direction in which the tape is played out by the second winding roll 132 will be called the reverse direction (one example of a second direction).

The guide rolls 133 are provided at specific intervals so as to scan the magnetic tape 10 in the desired direction between the first winding roll 131 and the second winding roll 132.

The head component 30 is disposed between the guide rolls 133, and has four magnetic heads as discussed below. The head component 30 relatively scans the main face of the magnetic tape 10 in the lengthwise direction, thereby recording and reproducing signals.

Figure 2:
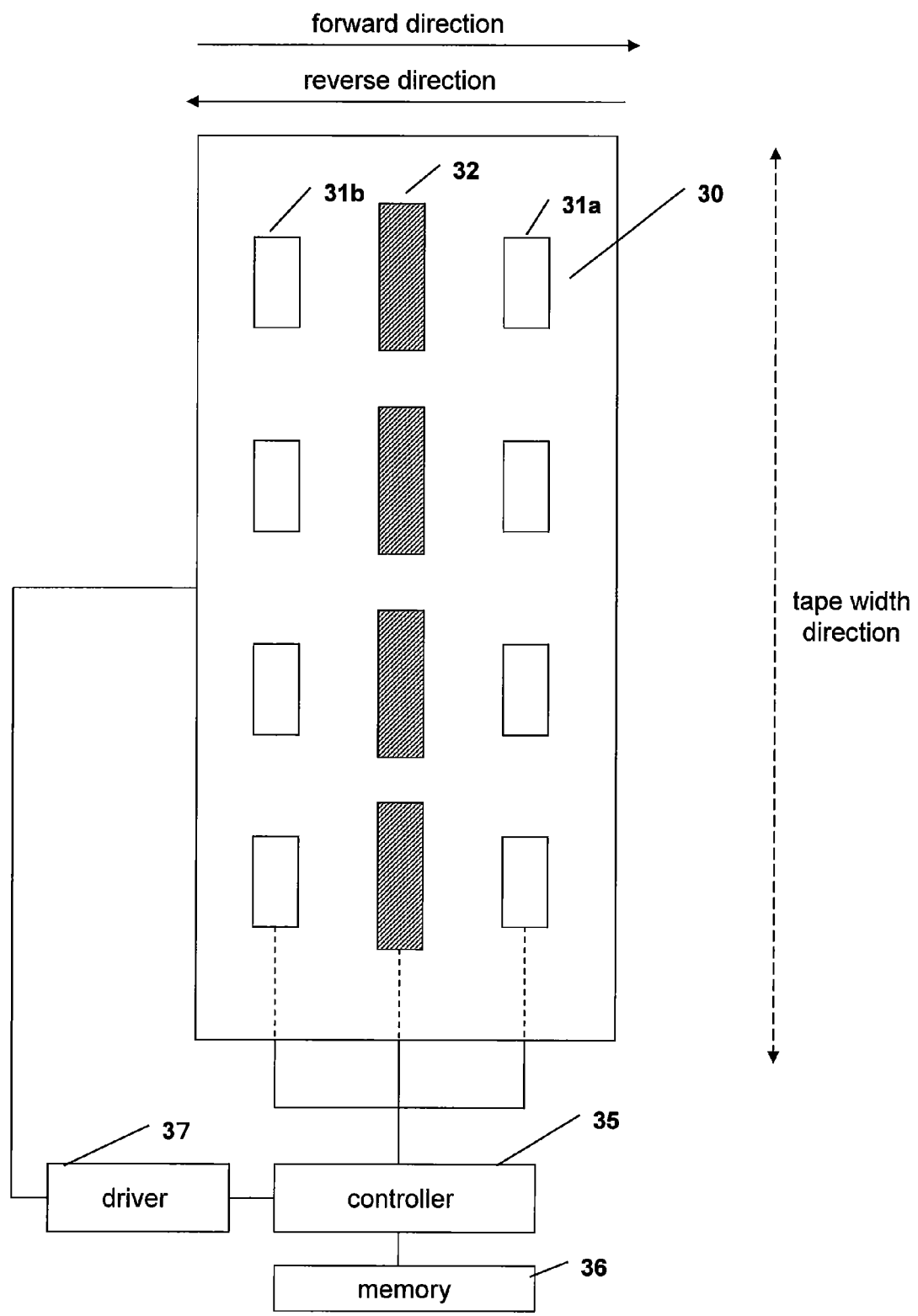
FIG. 2 is a simplified diagram of the configuration of a head component of the data recording apparatus.

FIG. 2 is a simplified view of the configuration of the head component 30.

The head component 30 has four pairs of reproduction magnetic heads 31a and 31b arranged along the width direction of the magnetic tape 10 (a direction that traverses the forward direction or reverse direction), and four recording magnetic heads 32. As shown in FIG. 2, a reproduction magnetic head 31a, a recording magnetic head 32 (one example of a data recorder), and a reproduction magnetic head 31b are arranged as a set in the play-out direction (forward direction) of the magnetic tape 10.

The head component 30 further has a controller 35, a memory 36, and a driver 37. The controller 35 is constituted by a CPU or another processor, etc. The controller 35 controls the reading and recording of data from and to the reproduction magnetic heads 31a and 31b and the recording magnetic heads 32, and also controls the driver 37.

The memory 36 holds data that has been read or the data to be recorded. In particular, the memory 36 has a storage capacity that allows it to hold any data that was not recorded properly until it is re-recorded for the purpose of retry processing.

The driver 37 drives the head component 30 in response to a command from the controller 35. For example, it moves the head component 30 in the tape width direction, that is, between tracks on the tape. One or the other of the reproduction magnetic heads 31a and 31b is selected by switching with the controller 35 according to the play-out direction of the magnetic tape 10.

1.2 Operation of Data Recording Apparatus 100

Figure 3:
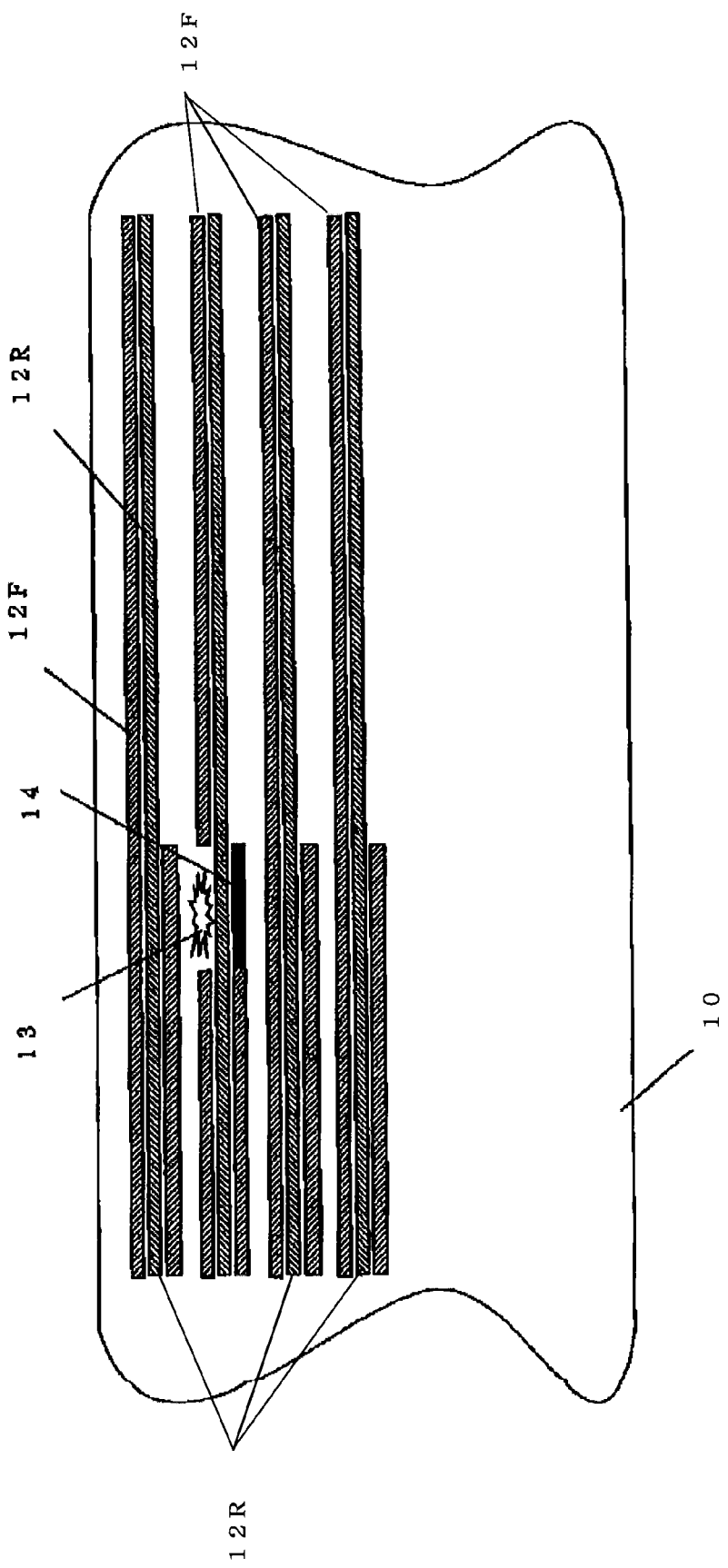
FIG. 3 is a schematic plan view of a magnetic tape on which data has been recorded according to Embodiment 1.

In a linear tape system, when the magnetic tape 10 is scanned in the forward direction or reverse direction, four tracks of a specific length are recorded simultaneously by the four recording magnetic heads 32 arranged in the tape width direction (see 12F in FIG. 3). More specifically, when the magnetic tape 10 is played out in the forward direction, data is simultaneously recorded to four tracks (12F in FIG. 3) by the recording magnetic heads 32. Once the recording of data to four tracks is complete, the head component 30 moves in the tape width direction by an amount equal to the track pitch. The magnetic tape 10 is then played out in the reverse direction, and data is simultaneously recorded on another four tracks (12R in FIG. 3) by the recording magnetic heads 32. Data is sequentially recorded to a plurality of tracks in the tape width direction by repeating this operation.

When the magnetic tape 10 is played out in the forward direction, the four reproduction magnetic heads 31a are selected by the controller 35. Data recorded on the magnetic tape 10 is simultaneously read by the four reproduction magnetic heads 31a. The controller 35 determines whether or not the data was recorded properly, based on the data that has been read. If it is determined that the data was not recorded properly, this data that was not recorded properly (hereinafter referred to as re-recording data) is temporarily stored in the memory 36, and is subjected to retry processing as discussed below.

On the other hand, when the magnetic tape 10 is played out in the reverse direction, the four reproduction magnetic heads 31b are selected by the controller 35. Data recorded on the magnetic tape 10 is simultaneously read by the four reproduction magnetic heads 31b. The controller 35 determines whether or not the data was recorded properly, based on the data that has been read. If it is determined that the data was not recorded properly, the re-recording data that was not recorded properly is temporarily stored in the memory 36, and is subjected to retry processing as discussed below.

Data recording pertaining to this embodiment will now be described in detail through reference to a comparative example.

1.2.1 Data Recording in Comparative Example

Figure 7:
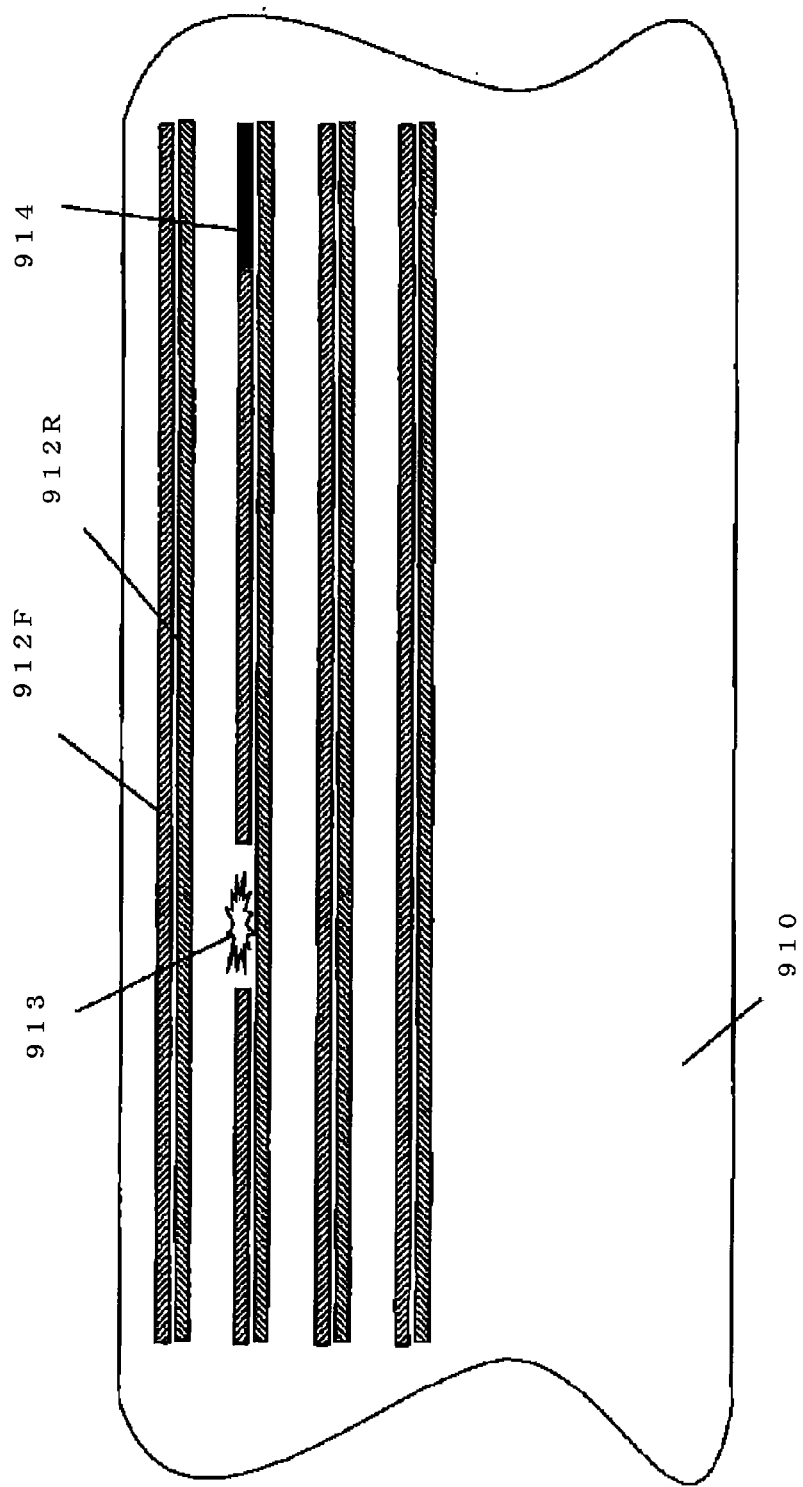
FIG. 7 is a schematic plan view of a magnetic tape on which data has been recorded according to a comparative example.

FIG. 7 is a schematic view of a magnetic tape on which data has been recorded in a comparative example. 910 is a magnetic tape, 912F is a recording track when the magnetic tape 910 is played out in the forward direction, 912R is a recording track when the magnetic tape 910 is played out in the reverse direction, 913 is a data defective region in which data was not recorded properly on the tape, and 914 is a re-recording region.

If there is a data defective region 913 on the tape, retry processing is performed. Retry processing involves re-recording the data that was supposed to be recorded to the data defective region 913. In this comparative example, as shown in FIG. 7, the data to be re-recorded is recorded to the re-recording region 914, which is different from the place where the data is supposed to be recorded, that is, the location of the data defective region 913. As shown in FIG. 7, if the re-recording region 914 is separated from (not contiguous with) the location of the data defective region 913, a step is required in which the data to be re-recorded is temporarily held in the memory 36 until the data is reproduced, and during reproduction, the data is rearranged in the order in which it will be reproduced. In this case, response will be slower during data reproduction.

1.2.2 Data Recording in this Embodiment

FIG. 3 is a schematic view of a magnetic tape on which data has been recorded in this embodiment. The magnetic tape 10 includes a recording track 12F when the magnetic tape 10 is played out in the forward direction, a recording track 12R when the magnetic tape 10 is played out in the reverse direction, a data defective region 13 in which data was not properly recorded on the tape, and a re-recording region 14.

If it is determined that the data was not properly recorded in a specific region on the track (such as the data defective region 13), for example, this re-recording data is temporarily stored in the memory 36. When the position where the re-recording data is supposed to be recorded gets close to the recording magnetic heads 32, the re-recording data is read from the memory 36 and re-recording is performed.

Figure 4:
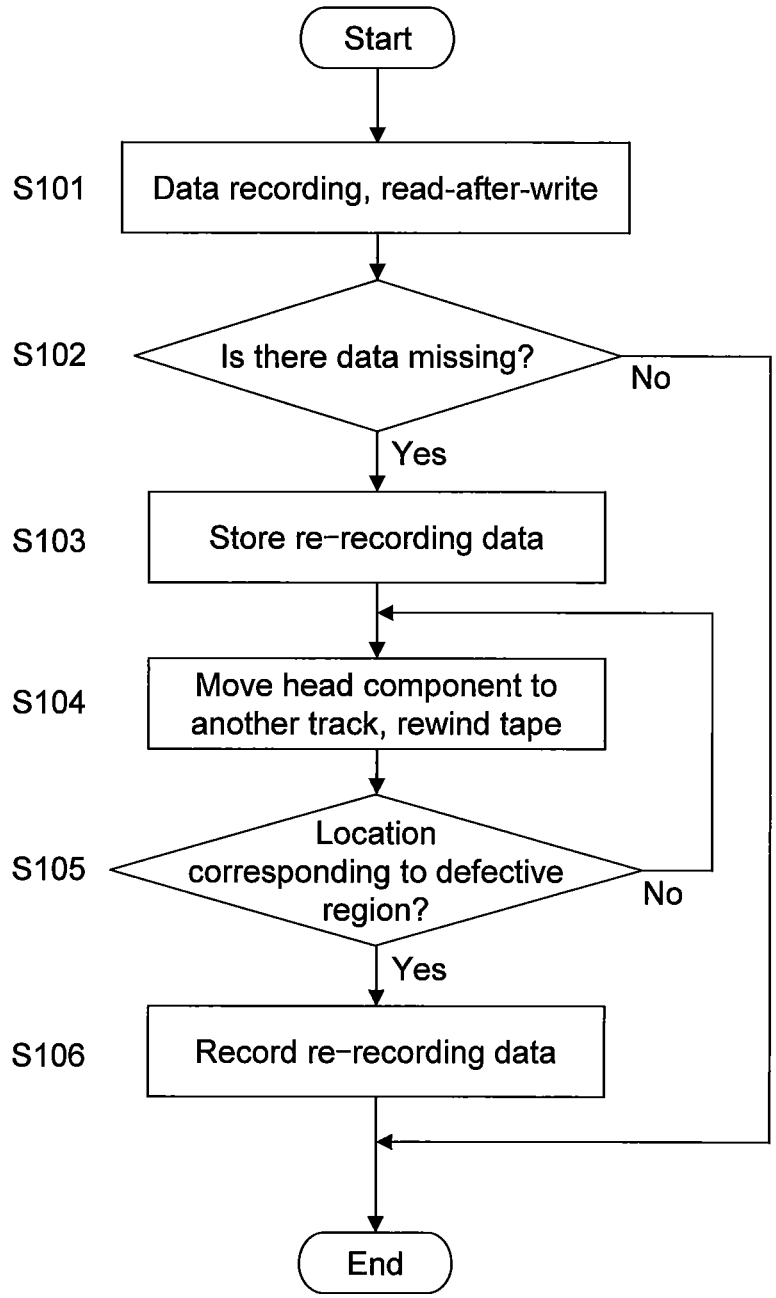
FIG. 4 is a flowchart of the retry processing according to Embodiment 1.

FIG. 4 shows retry processing by the controller 35 of the head component 30.

Step S101: The magnetic tape 10 is played out in the forward direction or the reverse direction, and the data read from the memory 36 is simultaneously recorded by the four recording magnetic heads 32. Then, the recorded data is simultaneously read by the four reproduction magnetic heads 31*a* or 31*b* (read after write).

Step S102: It is determined, on the basis of the data read by the reproduction magnetic heads 31*a* or 31*b*, whether or not there is data missing on the tape. More specifically, if the data was not properly read by the reproduction magnetic heads 31*a* or 31*b*, the controller 35 determines that there is a data defective region on the tape.

Step S103: If it is determined that there is a data defective region on the tape, then the data that was supposed to be recorded in the region determined to have data missing is designated, and is temporarily held in the memory 36 as re-recording data.

Step S104: The head component 30 is moved to another track and the magnetic tape 10 is rewound.

Step S105: As a re-recording region 214, it is determined whether or not the head component 30 is located at a region that is on another track and is at substantially the same location in the tape lengthwise direction as the data defective region 13, or a region that is on another track and at least overlaps the data defective region 13 in the tape lengthwise direction (hereinafter referred to as a position corresponding to the data defective region 13). In the example in FIG. 3, this movement of the head component 30 is performed as follows. When the data defective region 13 is designated while the magnetic tape 10 is being played out in the forward direction, the head component 30 is moved to another track (for recording in the forward direction), and the magnetic tape 10 is rewound by an amount equivalent to the data defective region 13. When the data defective region 13 is designated while the magnetic tape 10 is being played out in the reverse direction, the head component 30 is moved to another track (for recording in the reverse direction), and the magnetic tape 10 is rewound by an amount equivalent to the data defective region.

In steps S104 and S105, the head component 30 is moved to another track, the magnetic tape 10 is rewound, and the head component 30 is moved to a position corresponding to the data defective region 13. This operation may be performed for re-recording, but may also encompass a normal recording operation by the head component 30. That is, retry processing may be performed while the head component 30 performs normal recording on the region around the re-recording region 214 (a region of another track in the same direction as the re-recording near the re-recording region 214).

Step S106: Re-recording data is recorded. In the example in FIG. 3, the magnetic tape 10 is played out in the forward direction, and re-recording data is read from the memory 36 and recorded by the recording magnetic head 32 located at the re-recording region 14.

1.3 Features of Embodiment 1

In Embodiment 1, re-recording data is recorded in a region that is on another track and is at substantially the same location in the tape lengthwise direction as the data defective region 13. Thus, during data reproduction, data that has undergone retry processing when the data was not properly recorded, and data that was properly recorded can be read substantially continuously. As a result, the data can be rearranged in the order in which it will be reproduced, without waiting a long time until data that has undergone retry processing is read. Thus, the data can be reproduced with good response.

Embodiment 2

Data recording pertaining to Embodiment 2 will be described through reference to FIGS. 5 and 6. Those portions of the data recording apparatus and head component that are the same as in Embodiment 1 will be numbered the same and not described again.

What is different in Embodiment 2 from Embodiment 1 is that one of the four recording magnetic heads of the head component 30 is used exclusively for re-recording of data by retry processing, and that a re-recording track is provided to a magnetic tape 210 as discussed below. The details are as follows.

2.1 Data Recording in the Embodiment

Figure 5:
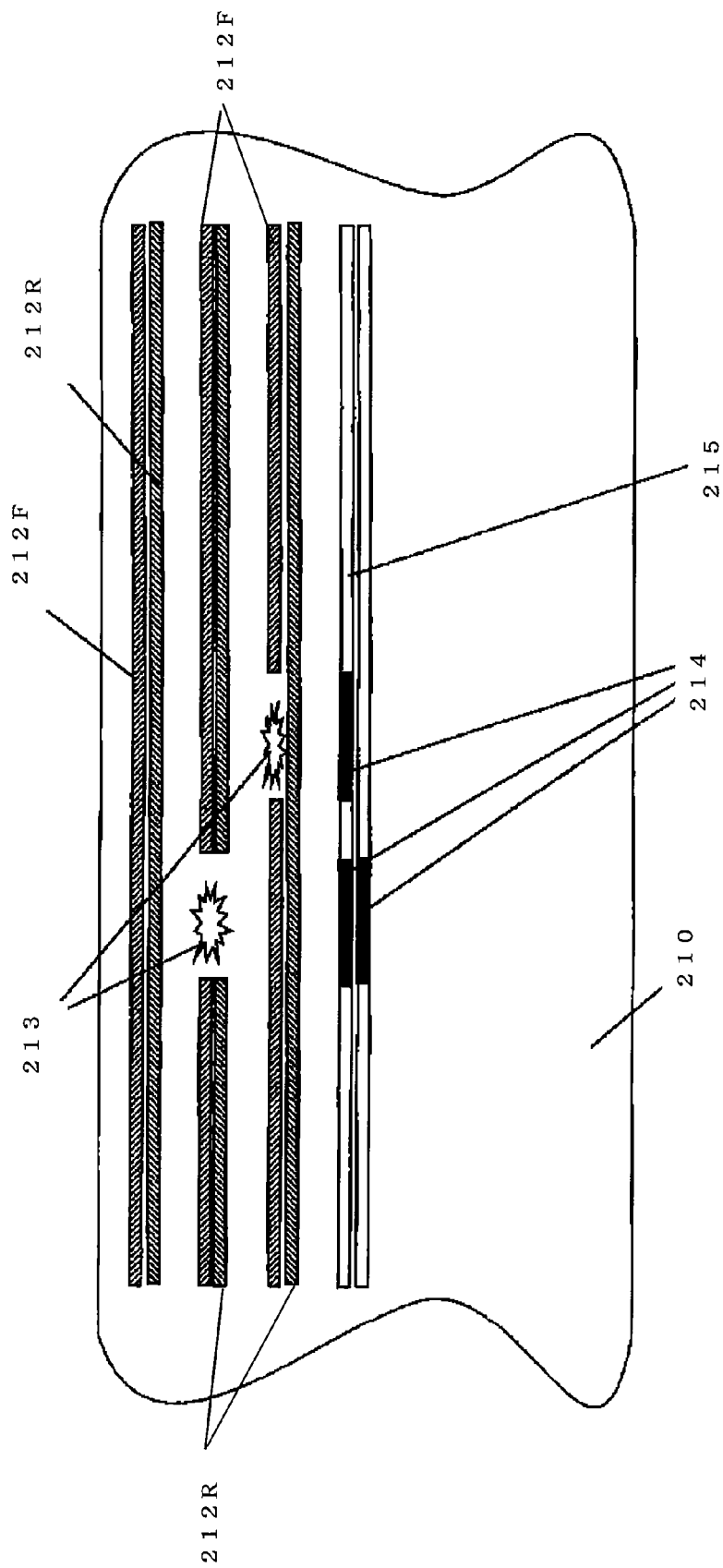
FIG. 5 is a schematic plan view of a magnetic tape on which data has been recorded according to Embodiment 2.

FIG. 5 is a schematic view of a magnetic tape on which data has been recorded according to Embodiment 2. The magnetic tape 210 (one example of a recording medium) includes a recording track 212F (one example of a first recording track) when the magnetic tape 210 is played out in the forward direction, a recording track 212R (one example of a second recording track) when the magnetic tape 210 is played out in the reverse direction, a data defective region 213 in which data was not properly recorded on the tape, a re-recording region 214, and a re-recording track 215 (one example of an extra track).

If it is determined that the data was not properly recorded in a specific region on the track (such as the data defective region 213), for example, this data is temporarily stored in the memory 36. The re-recording data is read from the memory 36 and re-recorded when the position where the re-recording data is supposed to be recorded gets close to the recording magnetic heads 32.

Figure 6:
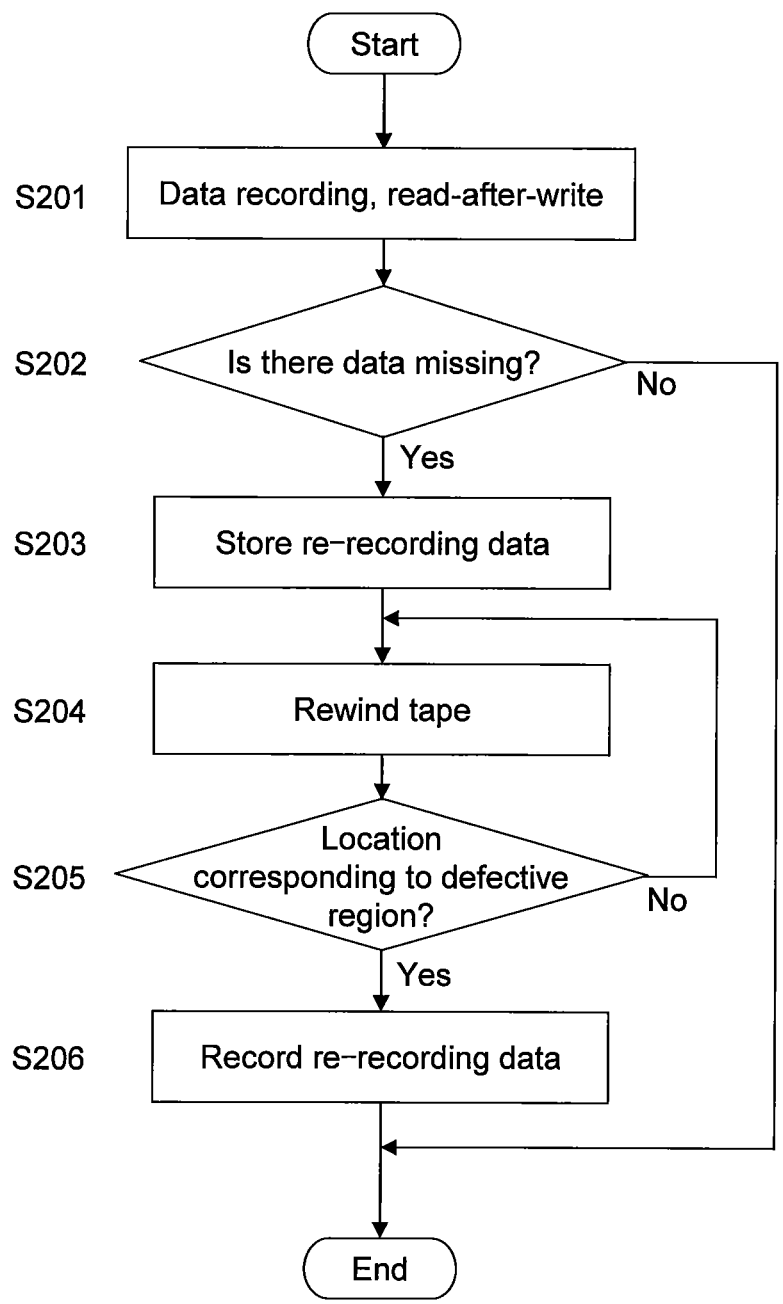
FIG. 6 is a flowchart of the retry processing according to Embodiment 2.

FIG. 6 shows the retry processing performed by the controller 35 of the head component 30 in Embodiment 2.

Step S201: The magnetic tape 210 is played out in the forward direction or the reverse direction, and the data read from the memory 36 is simultaneously recorded by the three recording magnetic heads 32. Then, the recorded data is simultaneously read by the three reproduction magnetic heads 31*a* or 31*b* (read after write).

Step S202: It is determined, on the basis of the data read by the reproduction magnetic heads 31*a* or 31*b*, whether or not there is data missing on the tape. More specifically, if the data was not properly read by the reproduction magnetic heads 31*a* or 31*b*, the controller 35 determines that there is a data defective region on the tape.

Step S203: If it is determined that there is a data defective region on the tape, then the data that was supposed to be recorded in the region determined to have data missing is designated, and is temporarily held in the memory 36 as re-recording data.

Step S204: The magnetic tape 210 is rewound.

Step S205: As the re-recording region 214, it is determined whether or not the other one of the recording magnetic heads 32 of the head component 30 is located at a position corresponding to the data defective region 213 on the re-recording track 215 which is another track. In the example in FIG. 5, this movement of the recording magnetic head 32 is performed as follows. When the data defective region 213 is designated while the magnetic tape 210 is being played out in the forward direction, the magnetic tape 210 is rewound by an amount equivalent to the data defective region 213. The magnetic tape 210 is also rewound by an amount equivalent to the data defective region when the data defective region is designated while the magnetic tape 210 is being played out in the reverse direction.

In steps S204 and S205, the magnetic tape 210 is rewound, and the recording magnetic head 32 is moved to a position corresponding to the data defective region 213. This operation may be performed for re-recording, but may also encompass a normal recording operation by the head component 30. That is, retry processing is performed while the head component 30 performs normal recording on the region around the re-recording region 214 (a region of another track in the same direction as the re-recording near the re-recording region 214).

Step S206: Re-recording data is recorded. In the example in FIG. 5, the magnetic tape 210 is played out in the forward direction or the reverse direction, and re-recording data is read from the memory 36 and recorded by the recording magnetic head 32 located at the re-recording region 214.

2.2 Features of Embodiment 2

In Embodiment 2, re-recording data is recorded in a region that is on another track and is at substantially the same location in the tape lengthwise direction as the data defective region 213. Thus, during data reproduction, data that has undergone retry processing when the data was not properly recorded, and data that was properly recorded can be read substantially continuously. Furthermore, more data that has undergone retry processing can be re-recorded at a location corresponding to the data defective region 213 than in Embodiment 1. As a result, more data can be rearranged in the order in which it will be reproduced, without waiting a long time until data that has undergone retry processing is read. Thus, the data can be reproduced with good response.

Furthermore, in Embodiment 2, since a single recording magnetic head is used exclusively for retry processing, the head component 230 does not need to move between tracks for retry processing, so the retry processing can be carried out faster.

2.3 Modification of Embodiment 2

In Embodiment 2 above, a single recording magnetic head was used exclusively for the re-recording of data by retry processing, but the head component 30 may be moved to the re-recording track 215 and re-recording performed just as in Embodiment 1. The four magnetic heads of the head component 30 in this case can be used for recording in step S201.

In Embodiment 2 above, just one magnetic head was used exclusively for retry processing, but two or more magnetic heads may be used when there are more than four magnetic heads.

Other Embodiments

In Embodiments 1 and 2 above, an example was described in which there were four magnetic heads of the head component 30 of the data recording apparatus 100, and the magnetic tape had multiple tracks arranged in four parallel channels, but the present invention is not limited to this. The number of magnetic heads of the data recording apparatus 100, the number of channels of the magnetic tape 10, and the number of tracks may be greater than or less than those in the above example.

Also, in Embodiments 1 and 2 above, the head component 30 had the reproduction magnetic heads 31a, the recording magnetic heads 32, and the reproduction magnetic heads 31b arranged in that order in the tape lengthwise direction, but the present invention is not limited to this. For example, the arrangement order may be recording magnetic heads, reproduction magnetic heads, and recording magnetic heads. Furthermore, a reproduction magnetic head and a recording magnetic head may constitute a set, and two sets may be arranged in the tape lengthwise direction, so that the controller switches between the two sets when the tape play-out is in the forward direction and when it is in the reverse direction.

In Embodiments 1 and 2 above, an example was given of recording data on a magnetic tape, but the present invention is not limited to this, and may instead be applied to other magnetic recording media, optical recording media, recording methods featuring an optical pickup and a phase change recording medium, and other such recording media.

The present invention is not just a data recording apparatus or a recording medium, but also a data recording method.

The present invention is useful as a data recording apparatus or data recording method including a data streamer that backs up data, such as a server. It is also useful as a recording medium used in such a data streamer.

GENERAL INTERPRETATION OF TERMS

In understanding the scope of the present invention, the term "comprising" and its derivatives, as used herein, are intended to be open-ended terms that specify the presence of the stated features, elements, components, groups, integers, and/or steps, but do not exclude the presence of other unstated features, elements, constituent parts, groups, integers and/or steps. The foregoing also applies to words having similar meanings such as the terms "including," "having," and their derivatives. Also, the terms "part," "section," "portion," "member," "element," and so forth when used in the singular can have the dual meaning of a single part or a plurality of parts.

The term "configured" is used herein to describe a component, section, or part of a device includes hardware and/or software that is constructed and/or programmed to carry out the desired function.

Terms of degree such as "substantially," "about," and "approximately" as used herein mean that a reasonable amount of deviation is permitted in equivalent terms such that the end result is not significantly changed.

While only selected embodiments have been given to illustrate the present invention, it will be apparent to those skilled in the art from this disclosure that various changes and modifications can be made herein without departing from the scope of the invention as defined in the appended claims. For example, changes can be made as desired and/or as needed in the size, shape, position, or orientation of the constituent parts. Those constituent parts shown as being directly linked together or in contact may be constituted such that something is in between them. The function of one element may be executed by a plurality of elements, or the functions of a plurality of elements may be executed by a single element. The structure and function of one embodiment may be applied to other embodiments. All of the effects in a given embodiment need not be present at the same time.

What is claimed is:

1. A data recording apparatus for recording data to a recording medium having one or more tracks arranged in parallel, said data recording apparatus comprising:
 a data recorder configured to record the data to the one or more tracks, at least one track being a re-recording region;
 a memory configured to store the data; and
 a controller configured to control the data recorder,
 wherein the controller:
 determines whether or not the one or more tracks include a data defective region in which the data has not been recorded properly,
 stores in the memory the data that has not been recorded properly,
 designates a position corresponding to the data defective region, the position in another track from the data defective region and arranged in parallel to the data defective region such that the position overlaps the data defective region in a lengthwise direction of the recording medium, and
 reads from the memory the data that has not been recorded properly, and records the data that has not been recorded properly to the position corresponding to the data defective region.

2. The data recording apparatus according to claim 1, wherein:
 the one or more tracks are a plurality of tracks, and
 the controller designates the position corresponding to the data defective region in another track arranged in parallel to the track determined to include the data defective region, and records the data that has not been recorded properly.

3. The data recording apparatus according to claim 1, wherein:
 the memory has a storage capacity that allows the data that has not been recorded properly to be held until the data that has not been recorded properly is recorded at the position corresponding to the data defective region.

4. The data recording apparatus according to claim 1, further comprising:
 a driver configured to move the data recorder in a direction that traverses the track;
 wherein the controller designates the position corresponding to the data defective region by moving the data recorder with the driver.

5. The data recording apparatus according to claim 1, wherein:
 the data recorder is a plurality of data recorders arranged so as to face the tracks arranged in parallel, and record the data simultaneously to the plurality of tracks.

6. The data recording apparatus according to claim 1, wherein:
 the data recorder is a plurality of data recorders arranged so as to face the tracks arranged in parallel, the data recorder being configured to record the data in the forward and backward directions along the plurality of tracks.

7. The data recording apparatus according to claim 1, wherein:
 the data recorder performs magnetic recording.

8. The data recording apparatus according to claim 1, further comprising:
 a data reproduction component disposed adjacent to the data recorder in a direction of the one or more tracks, wherein the data reproduction component reads the data following the recording of the data by the data recorder.

9. The data recording apparatus according to claim 1, wherein further:
 the position is at substantially the same location, in a lengthwise direction of the recording medium, as the data defective region.

10. The data recording apparatus according to claim 1, wherein further:
 the position includes a first length in a lengthwise direction of the recording medium;
 the data defective region includes a second length in a lengthwise direction of the recording medium;
 and the first length and the second length are equal.

11. A data recording apparatus for recording data to a recording medium having one or more tracks arranged in parallel, said data recording apparatus comprising:
 a data recorder configured to record the data to the one or more tracks;
 a memory configured to store the data; and
 a controller configured to control the data recorder;
 wherein the controller:
 determines whether or not the one or more tracks include a data defective region in which the data has not been recorded properly,
 stores in the memory the data that has not been recorded properly,
 designates a position corresponding to the data defective region, the position in a track arranged in parallel to the data defective region,
 reads from the memory the data that has not been recorded properly, and records the data that has not been recorded properly to the position corresponding to the data defective region,
 the data recorder is a plurality of data recorders arranged so as to face the tracks arranged in parallel, and
 at least one of the plurality of data recorders exclusively records the data that has not been recorded properly at the position corresponding to the data defective region.

12. A data recording method, in which data is recorded to a recording medium having one or more tracks arranged in parallel, comprising:
 designating a data defective region in which the data has not been recorded properly to the one or more tracks; and
 recording the data that has not been recorded properly, to a position in another track from the data defective region and arranged in parallel to the data defective region such that the position overlaps the data defective region in a lengthwise direction of the recording medium.

13. The method according to claim 12, wherein further:
 the position includes a first length in a lengthwise direction of the recording medium;
 the data defective region includes a second length in a lengthwise direction of the recording medium;
 and the first length and the second length are equal.

14. The method according to claim 12, wherein further:
 the position is at substantially the same location, in a lengthwise direction of the recording medium, as the data defective region.

15. A recording medium comprising:
 a plurality of tracks including a recording track and an extra track;
 the recording track configured to store data in a lengthwise direction of the recording medium;
 the recording track and the extra track arranged in parallel;
 the data including properly reproduced data and improperly reproduced data, the improperly recorded data disposed at a first position in the lengthwise direction of the recording medium;

the extra track including properly reproduced data corresponding to the improperly recorded data disposed at a second position in the lengthwise direction of the recording medium;

the second position overlapping the first position.

16. The recording medium according to claim 15, wherein:

the plurality of tracks further include a first recording track and a second recording track;

the first track is configured to store data in a first direction;

the second track is configured to store data in a second direction; and the first direction and the second direction are opposite directions.

17. The recording medium according to claim 15, wherein:

the recording medium is a magnetic recording medium.

18. The recording medium according to claim 15, wherein further:

the second position is at substantially the same location, in a lengthwise direction of the recording medium, as the first position.

19. The recording medium according to claim 15, wherein further:

the first position includes a first length in a lengthwise direction of the recording medium;

the second position includes a second length in a lengthwise direction of the recording medium; and the first length and the second length are equal.

\* \* \* \* \*